Feb. 10, 1931.  G. A. BUTTRESS  1,791,791
METHOD OF PRODUCING FABRICATED LATH PANELS
Filed Nov. 23, 1927  2 Sheets-Sheet 2
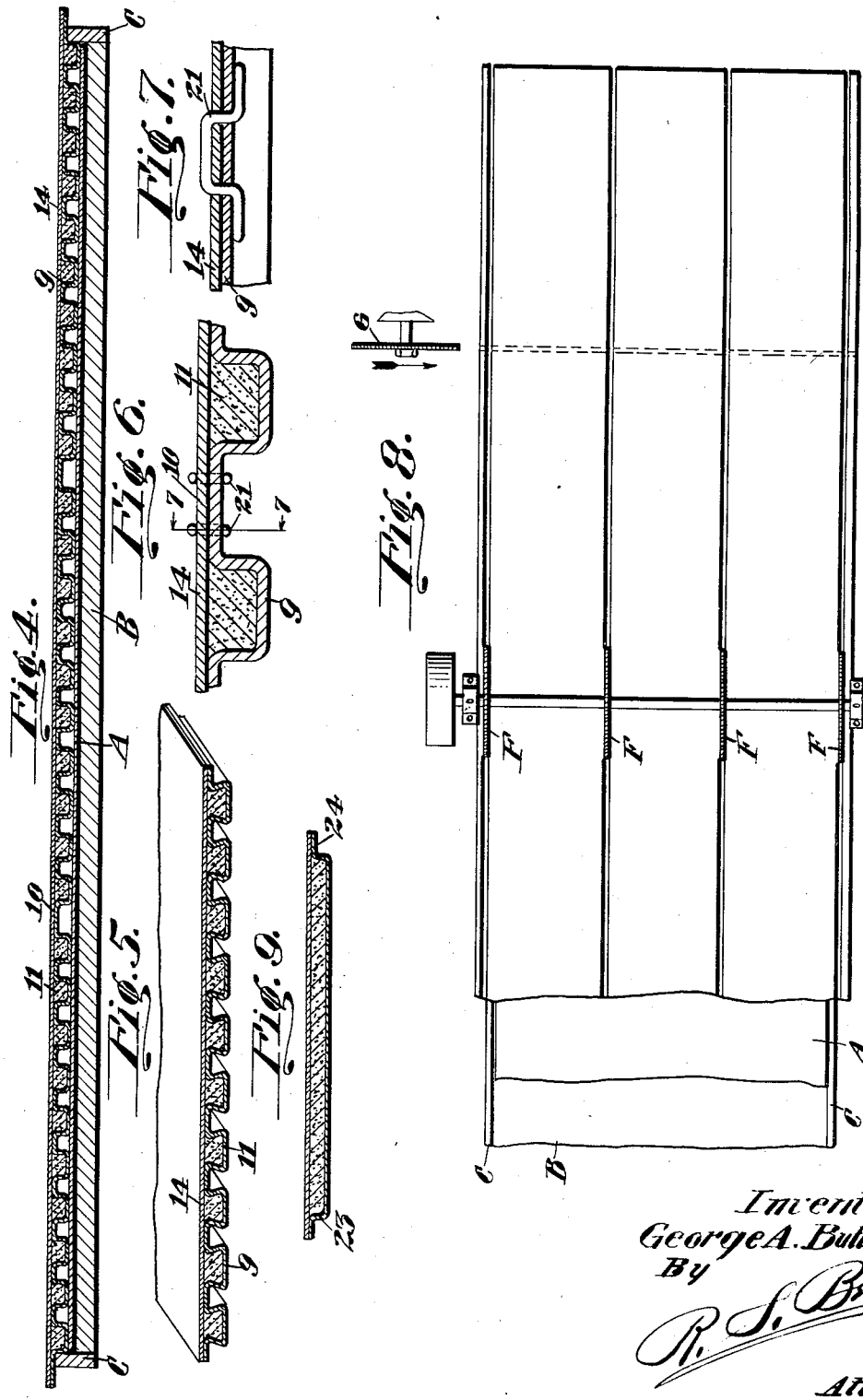

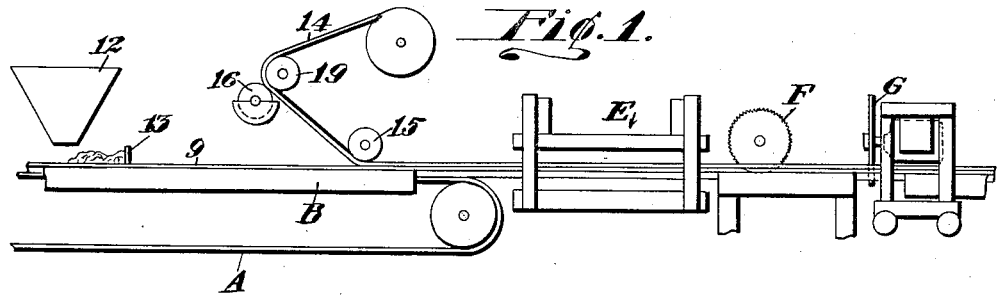
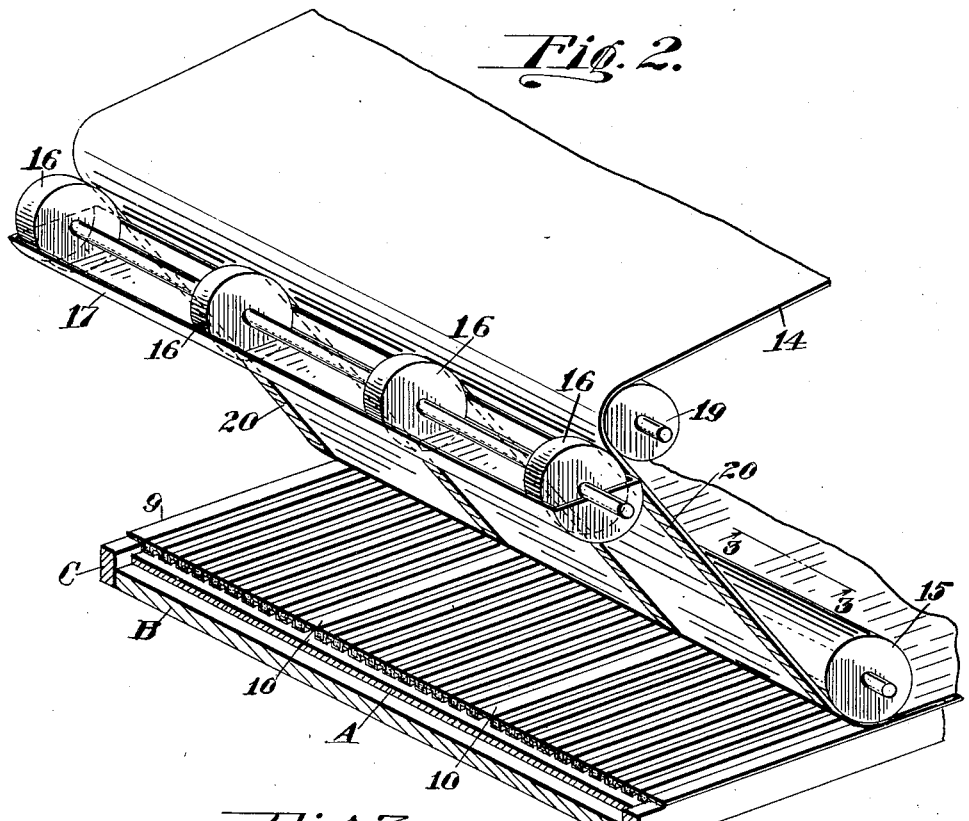
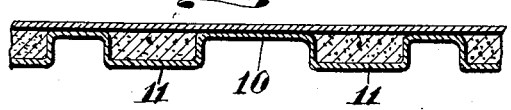

Patented Feb. 10, 1931

1,791,791

UNITED STATES PATENT OFFICE

GEORGE A. BUTTRESS, OF LOS ANGELES, CALIFORNIA, ASSIGNOR, BY DIRECT AND MESNE ASSIGNMENTS, TO F. AND B. HOLDING CO., OF LOS ANGELES, CALIFORNIA, A CORPORATION OF CALIFORNIA

METHOD OF PRODUCING FABRICATED LATH PANELS

Application filed November 23, 1927. Serial No. 235,214.

This invention relates to a method of forming sheet material embodying a plaster composition interposed between two sheets of paper; and more particularly pertains to a method of forming lath panels embodying spaced parallel composition ribs interposed between and carried by facing and backing sheets.

In the ordinary methods of producing wall board and lath of the above character, it is the practice to feed a wet unstable plastic composition, which hardens when dry, between two sheets of paper and rolling or pressing the structure to form a ribbon of the material. The formed ribbon is advanced usually on a long belt in order to allow the plaster to set and harden, after which the ribbon is trimmed and cut into lengths. This method requires the use of machinery, which takes up extensive floor space, and necessitates the loss of considerable time occasioned by waiting for the plaster to set and harden before cutting the ribbon. The speed of production is also limited because the advancing ribbon must be moved slowly in order to avoid excessive vibration, as advancing of the ribbon at high speed causes such vibration as to break up the plaster while setting.

An object of the invention is to provide a method whereby a sheet material of the character above referred to may be formed in a ribbon and cut into dimensioned panels while the plastic composition is wet and soft, and before setting thereof, so as to obviate the delay incident to allowing the plastic composition to set or harden before finishing the material to dimensioned sizes as now generally practiced, and whereby the use of a long belt and other mechanisms and structures for accommodating the board while allowing the plastic composition to set and harden preparatory to cutting to finished sizes, is dispensed with.

Another object is to provide a method of making a corrugated lath board embodying a plastic composition interposed between a backing sheet and a corrugated facing sheet, whereby the filled corrugations will be retained in shape while wet and during cutting of the initially formed board into dimensioned panels without the use of molds or forms conforming to the corrugations as is now generally known in the art.

Another object is to provide a method of the above character whereby a large number of dimensioned rib lath panels may be produced in a short time.

With the foregoing objects in view together with such other objects and advantages as may subsequently appear, the invention resides in the steps and features hereinafter described and claimed and illustrated by way of example in the accompanying drawings, in which:

Fig. 1 is a diagrammatic view in side elevation of an apparatus adapted to carry the invention into effect;

Fig. 2 is a perspective view illustrating the manner of applying a backing sheet to a previously formed corrugated facing sheet carrying composition ribs in the channels thereof;

Fig. 3 is a detail in cross section of the formed sheet ribbed lath as seen on the line 3—3 of Fig. 2;

Fig. 4 is a detail in cross section of the sheet lath as initially assembled and previous to cutting to commercial dimensions;

Fig. 5 is a perspective view of a fragmentary portion of the finished product;

Fig. 6 is a view in cross section illustrating a modification in the method of affixing the backing and facing sheets relatively to each other;

Fig. 7 is a detail in section as seen on the line 7—7 of Fig. 6;

Fig. 8 is a diagrammatic plan view illustrating the manner of cutting the lath board into finished widths and lengths;

Fig. 9 is a detail in section illustrating the invention as applied to the production of a wall board.

In carrying out the present invention, a previously corrugated sheet 9 of fibrous material such as pulp board is provided; this sheet being formed with the corrugations extending longitudinally thereof and with the corrugations of substantially rectangular cross section. This sheet 9 is preferably formed of such width that it may be divided longitudinally into a plurality of widths, each of which will include a series of spaced longitudinally extending ribs formed thereon as will presently be described. In forming this corrugated sheet certain corrugations thereof along which the sheet is to be divided longitudinally are formed of greater widths than the other corrugations as indicated at 10. This corrugated sheet is supported on and advanced by a belt A passing over a table B having upstanding margins C over and on which the longitudinal edges of the sheet 9 project. A moist and unstable plastic composition such as gypsum and other ingredients is applied to the sheet 9 to fill the corrugations on the side thereof opposite the wider corrugations 10; this plastic composition forming a series of spaced ribs 11. The composition may be applied to the sheet 9 in any suitable manner being here shown as being delivered thereto from a hopper 12 and while advancing the sheet 9 longitudinally thereunder. A scraper 13 may be employed to direct the composition into the channels or corrugations and to gage the composition so that its upper surface will lie substantially flush with the upper margins of the corrugations. A paper backing sheet 14 is placed over the facing sheet covering the plaster ribs formed in the channels and is caused to adhere to the composition ribs by impressing it into intimate contact therewith. This pressing action may be effected by means of a roller 15. The plaster possesses a sticky quality such that it will readily adhere to the sheets 9 and 14, which adhesion is further augmented by reason of the sheets 9 and 14 being fibrous and somewhat porous and absorptive.

In carrying out the present invention, the margins of the corrugated facing sheet 9 is also secured to the surface of the facing sheet constituting the widened corrugations 10. This interconnection between the backing sheet and facing sheet may be effected in any suitable manner, being preferably accomplished by means of an adhesive substance here shown as applied to the backing sheet along its margins and along the portions thereof to be impressed on the corrugations 10. For this purpose, I may employ a plurality of rollers 16 arranged in a trough 17 containing a liquid adhesive material against the peripheries of which rollers is fed the sheet 14 around a direction roller 19 whereby on advancing the sheet 14 between the rollers 16 and 19, strips 20 of the adhesive are applied to the backing sheet as indicated in Fig. 2, so that when the backing sheet is pressed onto the facing sheet, the strips 20 will adhere to the latter and thus retain the sheets together along their margins and along the widened corrugations 10. During this operation the upstanding margins C of the table B afford supports for the edges of the sheets.

It is obvious that the adhesive may be applied in any desired manner, and that in some instances it would be desirable to apply the adhesive so that the backing sheet would adhere to the portions of the corrugated sheet extending between the plaster ribs.

This connection of the sheets may be effected at the widened corrugations by means of staples 21 as shown in Figs. 6 and 7, and the staples are preferably applied in two rows so that the sheets may be cut longitudinally between the rows.

When the sheets have been thus secured together the plastic material will be confined within the corrugations and will form ribs of substantially rectangular cross section. I have found in practice that no molds or forms are necessary to retain the ribs in shape, even though the plastic composition be soft and the corrugated sheet be softened by moisture of the plastic; the materials being worked having sufficient stability to hold substantially to shape while being advanced on and by the flat belt.

After thus assembling the ribbon, it is subjected to a pressing action while advancing by suitable forming dies indicated at E, whereby the rectangular corrugations will be converted into dovetail corrugations as shown in Fig. 5. The ribbon is then trimmed along its edges and is severed along the wider corrugations 10 by means of saws F whereby it is formed into a plurality of ribbons of finished widths which are then cut transversely by a saw G to produce panels of finished lengths, as shown in Fig. 8, which are then stacked in suitable racks. The pressing and cutting and stacking operations are effected while the plastic composition is wet and soft, that is, before setting thereof.

While I have shown the invention as applied specifically to the production of ribbed sheet material it may be employed in the formation of wall board panels, in which event the facing sheet will be formed with upturned edge portions 23 terminating in outwardly extending margins 24 as shown in Fig. 9; the margins of the backing sheet being secured to the margins 24 in the manner before described so as to confine the plastic body between the sheets and thereby permit the ribbon being cut to finished sizes while soft and wet.

The ribbon may be formed of any suitable width and may be divided into any desired number of widths; the facing sheet being provided with the widened corrugations 10 along which the ribbon is to be severed, according to the number of widths desired. These widened corrugations serve to provide flaps on the margins of the finished panels; the bottom walls of these corrugations being severed centrally. In some instances it may be desirable to form the finished panels of approximately the width of the formed ribbon, in which event severance of the ribbon longitudinally into a plurality of ribbons would be dispensed with, and in this event the formation of the facing sheet with the widened corrugations 10 would not be necessary.

By means of this invention the panels are formed in finished dimensions before leaving the machine and accordingly a great saving of labor is effected over methods in which the panels are necessarily handled before cutting to finished sizes.

It will be seen that by confining the plastic between the margins of the sheets the latter may be worked while the plastic is wet, not only by cutting to sizes but impression of various sorts may be formed, without forcing the plastic from between the connected margins of the sheet.

While I have specifically described my invention with reference to cutting of the ribbon to dimensioned sizes, while the plastic is wet, it will be understood that in some instances it may be desirable to trim the marginal flaps formed by bringing the margins of the sheets together after the plastic has set and (or) dry particularly after the panels have been cut to lengths.

I claim:

1. The method of fabricating panels consisting in interposing between two fibrous sheets a wet plastic composition which sets, and which hardens when dry, uniting the margins of the sheets, directly connecting the sheets longitudinally intermediate the margins by fastenings interengaging the sheets, and severing the sheets along the connected portion.

2. The method of producing fabricated panels consisting in feeding and advancing superimposed ribbons of fibrous material, feeding a wet plastic composition which hardens when dry between the advancing ribbons, bringing the margins of the ribbons together and uniting same to form marginal flaps at each edge of the plastic body, bringing the ribbons together and uniting same longitudinally thereof intermediate their margins, separating the ribbons along the intermediate connected portions and to provide a plurality of widths of finished dimensions, and cutting the widths into finished lengths while advancing; the severance of the ribbons being effected while the plastic is wet and before setting thereof.

3. The method of fabricating ribbed sheet lath by feeding a facing sheet of longitudinally corrugated paper upon a support; filling the channels formed by the corrugations on one side of the sheet with a wet plastic composition, which, when dry, hardens so as to form spaced ribs; pressing a backing sheet over the ribs; connecting the longitudinal margins of the sheets so as to form flaps; and applying mechanical connecting means in two rows to the sheets longitudinally of at least one of the corrugations of the facing sheet and thereby connecting the sheets to each other.

4. The method of fabricating ribbed sheet lath consisting in feeding a facing sheet of longitudinally corrugated paper, filling the channels formed by the corrugations on one side of the sheet with a wet plastic composition which hardens when dry to form spaced ribs, pressing a backing sheet over the ribs, connecting the longitudinal margins of the sheets to form flaps, applying mechanical connecting means in two rows to the sheets along at least one of the corrugations of the facing sheet and thereby connecting the sheets to each other, and severing the sheets along such connections and between the rows of mechanical connecting means.

In testimony whereof, I have affixed my signature.

GEORGE A. BUTTRESS.